United States Patent [19]
Evans et al.

[11] 3,773,332
[45] Nov. 20, 1973

[54] AUTOMATIC RECORD PLAYERS

[75] Inventors: Philip Henry Evans, Stourbridge; Norman Lane, Halesowen, both of England

[73] Assignee: BSR Limited, Worley, Worcester, England

[22] Filed: Apr. 21, 1971

[21] Appl. No.: 136,157

[52] U.S. Cl. .......... 274/10 R
[51] Int. Cl. .......... G11b 17/16
[58] Field of Search .......... 274/10 R

[56] References Cited

UNITED STATES PATENTS

| | | | |
|---|---|---|---|
| 3,594,009 | 7/1971 | Cerudo | 274/10 R |
| 1,993,078 | 3/1935 | Wardrop | 274/10 R |

FOREIGN PATENTS OR APPLICATIONS

| | | | |
|---|---|---|---|
| 859,371 | 1/1961 | Great Britain | 274/10 R |

*Primary Examiner*—Louis R. Prince
*Assistant Examiner*—Steven L. Stephan
*Attorney*—Kurt Kelman

[57] ABSTRACT

In an automatic record player of the type wherein a cam shaft is driven by worm and wheel gearing from the turntable, an umbrella centre spindle is operated by a slide mounted below the record player deck plate for locking movement and reciprocating movement produced by separate cams on the cam shaft. A gear wheel on the cam shaft is in mesh with a worm rotatably mounted about a central depending boss on the turntable, which boss has a projecting dog which engages a pivoted driving pawl on the worm when this pawl is swung into the path of movement of the dog thus causing the turntable to drive the worm and rotate the cam shaft.

1 Claim, 9 Drawing Figures

AUTOMATIC RECORD PLAYERS

BACKGROUND OF THE INVENTION

1. Field of the Invention

This invention relates to improvements in an automatic record player for playing disc records and in which automatic mechanism is provided to perform a certain cycle of operations. In a complete cycle of operations, when the automatic mechanism operates upon the record player being switched on, the pick-up arm is raised from its rest and moved inwardly to a position adjacent the edge of the record on the turntable and then is lowered until the stylus engages with the record groove. After playing of the record the mechanism again operates this time to raise the stylus from the record and swing the pick-up arm outwardly to its original position. In cases where the record player also includes means for supporting a stack of records upon a centre spindle, for automatic playing of records one by one, then after the playing of one record and the movement of the pick-up arm outwardly, the automatic mechanism also operates the mechanism of the centre spindle to cause the lowermost record of the stack to drop on to the turntable and then the pick-up arm is moved back inwardly to the position adjacent the edge of the record followed by lowering of the stylus on to the record and playing thereof. Such automatic operation of playing one record after another continues until the last record of the stack has been played, whereupon the automatic mechanism also operates to switch off the record player.

2. Description of the prior art

There is a type of such automatic record player in which the automatic mechanism for performing such cycle of operations comprises a single cam shaft carrying a number of cams and driven by worm and wheel gearing from the rotating turntable, there being a gear wheel fixed on the cam shaft and driven by a worm gear rotatably mounted about the axis of rotation of the turntable. The invention is concerned with this type of automatic record player.

SUMMARY OF THE INVENTION

The object of the invention is to provide, an improved means for operating the release mechanism of an umbrella centre spindle which supports a stack of records for automatic release one by one down on to the turntable.

According to the invention there is provided mechanism for operating an umbrella centre spindle in an automatic record player of the type which includes a rotatable cam shaft and worm and wheel gearing driven by the rotating turntable to rotate said cam shaft, the gear wheel of said gearing being fixed on the cam shaft and the worm gear being rotatably mounted about the axis of rotation of the turntable; said mechanism comprising an elongated slide mounted below the deck plate of the record player for reciprocating movement in a substantially horizontal plane and also rocking movement about a horizontal axis which is at right angles to the longitudinal axis of the slide, means on the slide for engaging the lower end of the umbrella centre spindle, a cam fixed on the cam shaft and engaging a projection on the slide to produce reciprocating movement of the slide, and a pair of identical cams fixed on the cam shaft at positions spaced apart axially of the cam shaft and engaging the slide on opposite slides of its longitudinal axis to produce said rocking movement of the slide.

DESCRIPTION OF PREFERRED EMBODIMENT

An embodiment of the invention is illustrated in the accompanying drawings wherein.

Figure 1:
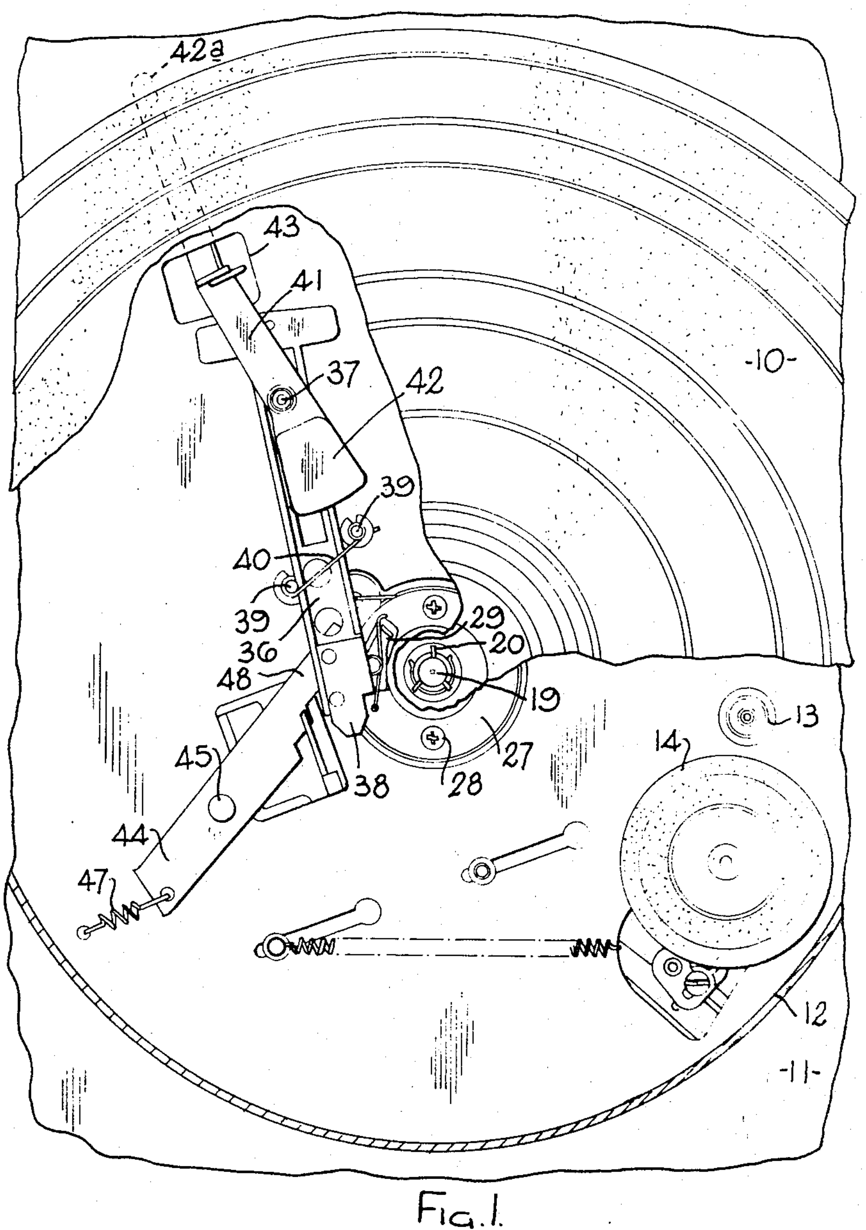
FIG. 1 is a fragmentary plan view looking down on the turntable of the record player with part of the turntable broken away to show the mechanism thereunder.

Referring to the plan view of FIG. 1, the turntable is indicated at 10 and the deck plate of the record player at 11, the turntable having on its under side a downwardly projecting rim 12 and the drive to the turntable is produced in generally conventional manner from the driving spindle 13 of an electric motor, which spindle projects upwardly through the deck plate and is engaged by the jockey pulley 14 when this moves into engagement with the rim 12 to transmit the drive from the spindle 13 to the turntable. The driving motor is indicated at 15 in FIG. 3 and is mounted on the under side of the deck plate and the driving spindle 13 is of the usual stepped formation so that the speed of rotation of the turntable is varied according to which stepped part of the spindle 13 is engaged by the jockey pulley 14.

Figure 4:
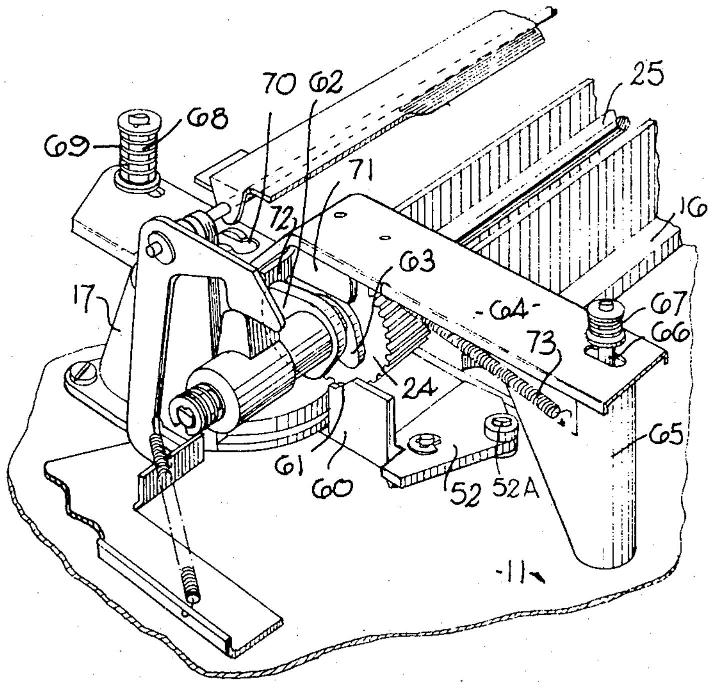
FIG. 4 is a fragmentary perspective view of a detail part of the mechanism in the underneath path view of FIG. 3.
Figure 3:
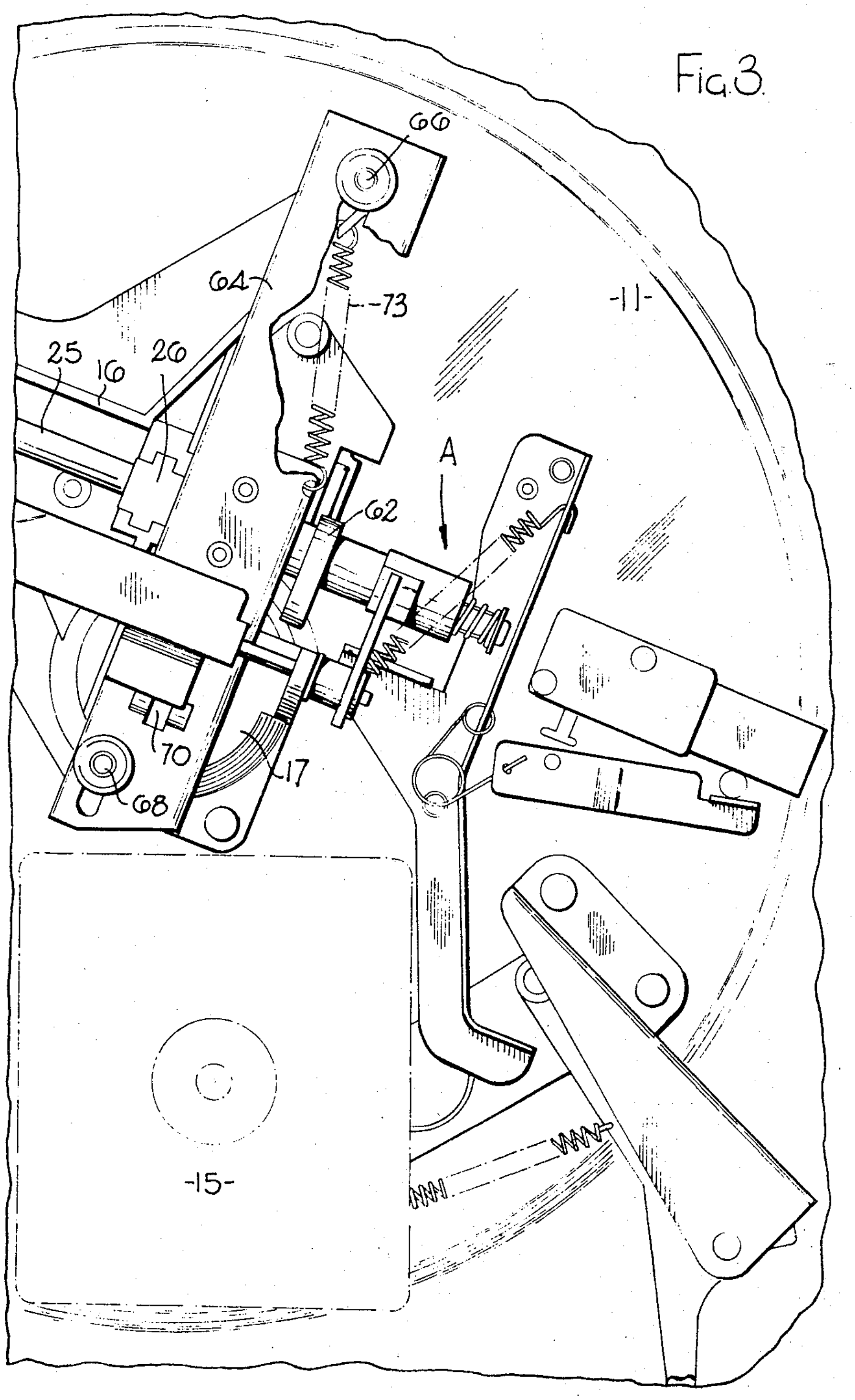
FIG. 3 is a fragmentary underneath plan view looking from below the deck plate of the record player.
Figures 7, 8, 9:
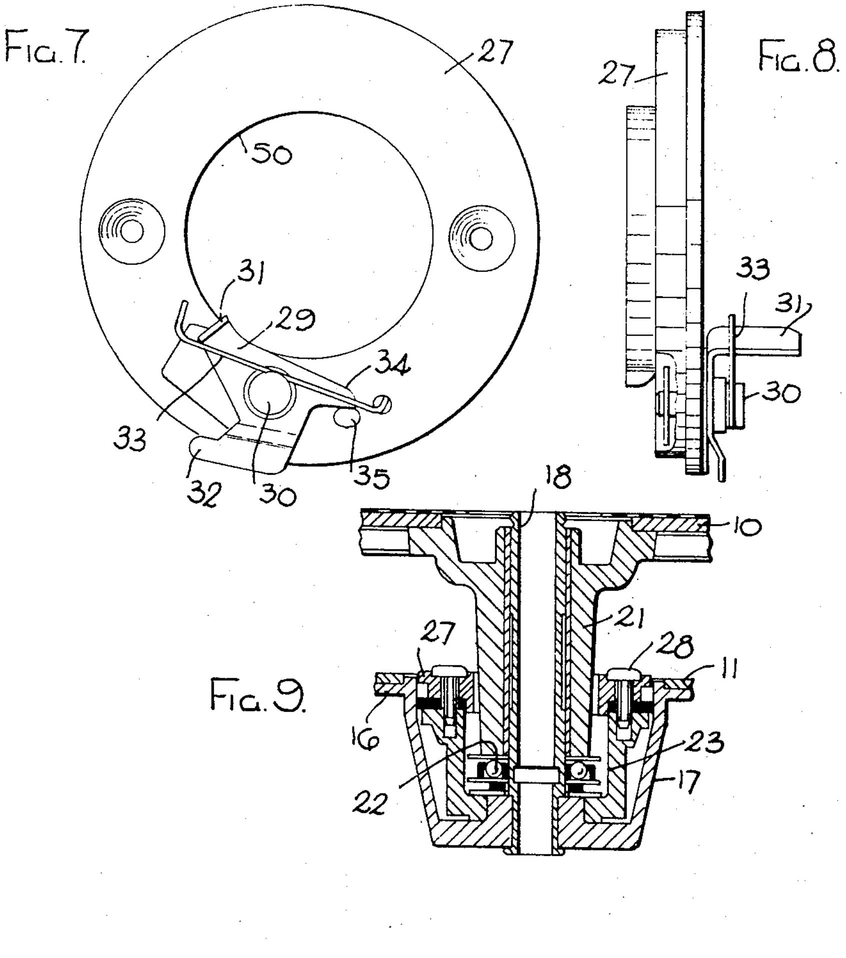
FIG. 7 is a plan view of an enlarged scale of the driving pawl of the worm and wheel gear.
FIG. 8 is a side view of FIG. 7.
FIG. 9 is a fragmentary section through the centre of the turntable.

Referring to FIGS. 3, 4 and 9 there is secured to the underside of the deck 11 a sub frame 16 which at the centre of the turntable has a downwardly projecting, part cylindrical well 17 in the base of which is fixed the lower end of a vertically extending tube 18 and when the record player is used with a centre spindle of the type for supporting a stack of records this centre spindle is inserted in and located by the tube 18. As seen in FIG. 1, a centre spindle 19 of the type known as an "umbrella" spindle is shown and this is the type of spindle which supports a stack of records by means of a plurality of radially extending blades 20 which are automatically withdrawn to allow the lowermost record of the stack to drop down the spindle on to the turntable 10.

The turntable 10 has a central depending boss 21 which rotates about the central tube 18 and is supported rotatably at its lower end by the roller bearing assembly 22 which is carried upon the base of the well 17.

Figure 5:
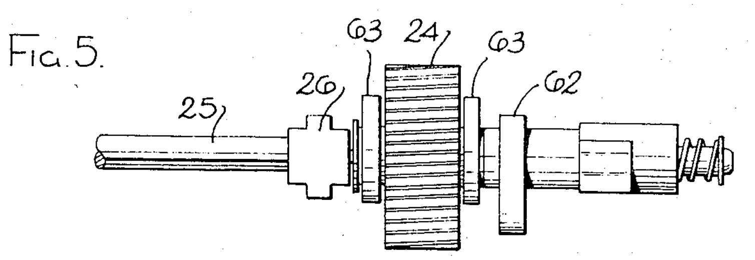
FIG. 5 is a plan view of the end of the control cam shaft below the deck plate of the record player.
Figure 6:
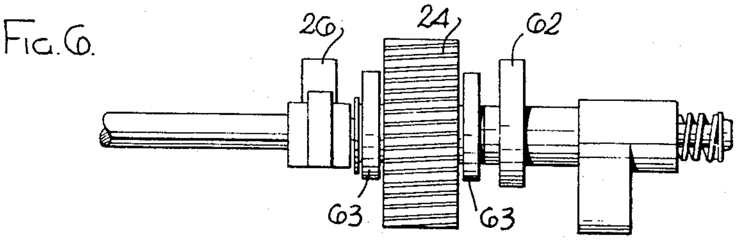
FIG. 6 is a side view of the end of the control cam shaft shown in FIG. 5.

Rotatably mounted in well 17 and co-axial with the vertical axis of the tube 18 is a hollow cylindrical worm gear 23 and at one side of the well 17 has a section cut away through which the worm gear 23 projects and thereby enables the worm gear to have meshing engagement with a gear wheel 24 fixed upon a control cam shaft 25 which is itself rotatably mounted in bearings held in the sub frame 16. The right hand end of this control cam shaft 25 is shown in FIGS. 5 and 6 and one of the bearings which supports the control shaft in the sub frame 16 is shown at 26.

A driving flange 27, which is shown in enlarged plan view in FIG. 7, is secured by screws 28 to the upper face of the worm gear 23. Pivotally mounted about the vertical axis 30 upper the face of the driving flange 27 is a driving pawl 29 which is the means for clutching the worm gear 23 to the rotating turntable boss 21 for the initiation of a cycle of operations as hereinafter described.

The driving pawl 29 has an upwardly projecting driving lug 31 and at the opposite side of the axis 30 it has a projecting nose 32. The driving pawl 29 is acted upon by a wire spring 33 coiled about the axis 30 and engaging the nose 31 so as to urge the driving lug 31 inwardly, the extent of inwards movement being limited by the engagement of a further nose 34 on the driving pawl against a peg 35 fixed in the driving flange 27.

In the position shown in FIG. 7, the driving pawl is in its operative driving position with the lug 31 projecting inwardly into a position in which it is clutched to the turntable boss 21 as hereinafter described. Normally, in the inoperative position, when drive is not being transmitted, the driving pawl is held by means hereinafter described against the pressure of its wire spring 33 in the position in which the driving lug 31 is retracted.

Referring back to FIG. 1, a trip arm 36 is mounted upon the deck plate 11 for limited angular pivotal movement upon a pivot pin 37, rotatably mounted in deck plate 11, which pin passes through an elongated slot in the trip arm 36 so that the trip arm is also capable of limited sliding movement in the horizontal plane about the pivot pin 37. A spring (not shown) acting between the trip arm 36 and the pivot pin 37 normally keeps the trip arm urged in the direction in which its nose 38 is urged towards the centre of the turntable and the angular pivotal movement of the trip arm 36 is limited by the two upstanding pegs 39 fixed in the deck plate, there being a wire 40 extending between the tops of the pegs 39 to prevent accidental upwards movement of this end of the trip arm 36.

The pivotal movement of the trip arm 36 is brought about by a trip lever 41 mounted upon the pivot pin 37 and light springs, disposed about pin 37, act between trip arm 36 and trip lever 41 so that when trip lever 41 is turned it also causes the trip arm 36 to turn, but trip arm 36 can still slide rectilinearly relatively to the pin 37 and trip lever 41. A pin projects downwardly from the end 42 of trip lever 41 and is adapted to engage behind a shoulder on the inside of the slot in trip arm 36 so that when trip arm 36 is pushed outwardly, against spring pressure, this pin snaps behind the shoulder and holds the trip arm 36 in this retracted position until released, as hereinafter described.

The trip lever 41 has an extension 42A extending down through an opening 43 in the deck plate 11 and positioned on the under side of the deck plate where it is actuated by mechanism, hereinafter referred to, to cause its pivotal movement for promoting the pivotal movement of the trip arm 36 for initiating operation of the driving pawl to clutch the worm gear to the turntable boss for starting a cycle of operations.

Figure 2:
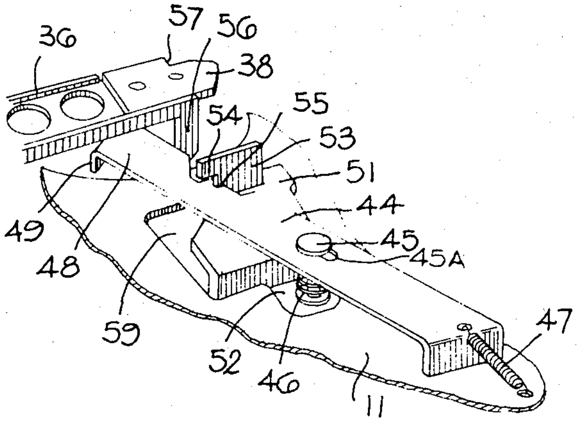
FIG. 2 is a perspective view of a detail of part of the mechanism immediately below the turntable.

Referring now to FIGS. 1 and 2, a latch 44 is mounted upon the deck plate 11 for pivotal movement about a pin 45, there being a spring 46 below the latch 44 and about the pin 45 which tends to urge the latch upwardly and there being a further spring 47 acting between the end of the latch 44 and the deck plate and tending to pivot the latch about the pin 45 in the direction in which the inner end 48 of the latch is moved inwardly in the direction towards the driving pawl 29 at the centre of the deck plate 11.

At this inner end 48 the latch 44 has a downwardly projecting lug 49 and in the position of no drive, as shown in FIG. 1, this downwardly projecting lug 49 is engaging over the nose 32 of the driving pawl 29 and is holding the driving pawl in a retracted position in which its driving lug 31 is retracted to the outside of the internal diameter 50 of the driving flange 27.

Associated with latch 44 is a latch lock 51, part of which projects above the deck plate 11 and part of which projects below and, as seen in FIG. 2, this latch lock 51 has a horizontally projecting flange 52 in which the pivot pin 45 is mounted. At its other end and above the deck plate 11 the latch lock 51 has an upwardly projecting nose 53 which is provided with two shoulders 54 and 55 spaced at different distances from the level of the deck plate 11 and in the position shown in FIG. 2 the latch 44 is engaging under the lowermost shoulder 55 so that its lug 49 at the end is held close to the deck plate 11 and also the positioning of the spring 47 is such that it also tends to urge the end 48 of the latch 44 in the direction away from the deck plate 11 so that in the position shown in FIG. 2 the shoulder 55 of the latch lock 51 is holding the latch 54 in a downwards position against the action of the spring 47 and once the latch 44 is pivoted to move it out of engagement with the shoulder 55 the spring 47 will rock it about the pin 45 and cause the end 48 to move away from the deck plate 11 until it is stopped by engagement with the second shoulder 54 of the latch lock.

At its inner end 38 the trip arm 36 has a downwardly projecting lug 56 and when the trip arm 36 is moved longitudinally, that is in the upwards direction as seen in FIG. 1 and to the left as seen in FIG. 2, this lug 56 engages the outer end 48 of the latch 44 and causes the pivotal movement of the latch which then releases it from the shoulder 55 and enables it to move under the influence of spring 47 into engagement with the upper shoulder 54 of the latch lock.

In addition to the downwardly projecting lug 56 the trip arm 36 has on its end 38 a shoulder 57.

Operation of Worm and Wheel Drive to Control Cam Shaft 25⅓

The central boss 21 on the turntable has a small radially projecting dog which is not shown in the drawings but is positioned so that it rotates in a plane which is substantially positioned so that it rotates in a plane which is substantially coincident with the plane occupied by the nose 38 on the trip arm and the drive to the worm and wheel gearing from the turntable is initiated when the trip arm 36 is moved pivotally in the anticlockwise direction, seen in FIG. 1, so as to bring the shoulder 57 into the path of movement of this dog on the turntable boss.

Such anti-clockwise pivotal movement of the trip arm 36 is brought about by an anti-clockwise pivotal movement of the trip lever 41, causing trip arm 36 to move pivotally so as to bring the shoulder 57 into the path of the aforesaid dog on the rotating turntable boss 21.

The movement of the trip lever 41 is brought about by the mechanism and in the manner described in our co-pending application Ser. No. 253,139 and where the record player is being started up for the first time to play this movement of the trip lever 41 is brought about by movement of mechanism operated by manual means. If a stack of records is being supported upon the centre spindle 19 then after starting of the record player manually the movement of the trip lever 41 for subsequent records which drop on to the turntable is brought about by automatic mechanism also described in the aforesaid co-pending application.

Such mechanism also has re-set means to move trip lever 41 clock-wise, thus moving trip arm 36 and releasing the pin on the end 42 from the shoulder in the slot of the trip arm so that this returns to its original inoperative position.

Once the drive to the worm and wheel gearing has been initiated the first part of a cycle of operations comprises the raising of the pick-up arm from its rest, the swing of the pick-up arm inwardly to a position adjacent the edge of the record on the turntable and the lowering of the pick-up arm until the stylus engages the record. At this point the worm and wheel drive is disconnected by means hereinafter described and the control cam shaft 25 remains stationary during the playing of the record.

At the end of playing of the record the stylus of the pick-up arm moves into what is called the run-out groove at the centre of the record and this rapid final inwards movement of the pick-up arm initiates operation of further mechanism as described in the aforesaid co-pending application to once again operate the trip lever 41 and thus move the trip arm 36 to bring its shoulder 57 into the path of movement of the dog on the turntable boss and again initiate the worm and wheel drive to the cam shaft 25 for the final part of the cycle involving the raising of the pick-up from the record, swinging of the pick-up arm out to its original position and, if the record is the last of the stack or is the only record on the turntable, the final movement involves the lowering of the pick-up arm on to its rest.

As viewed in FIG. 1, the turntable is rotating in a clockwise direction so that when the dog on the turntable boss 21 engages the shoulder 57 on the trip arm 36 it will move the trip arm 36 radially outwardly against the pressure of its return spring and this will cause the downwardly projecting lug 56 on the trip arm to engage the end 48 of latch 44 and pivot this latch about its pivot pin 45 thus releasing the latch from engagement with the shoulder 55 on the latch look and allowing the latch 44 to pivot about a horizontal axis so that its end 48 moves upwardly until stopped by the second shoulder 54 on the latch lock. This upwards movement of the end 48 of the latch 44 releases its downwardly presented lug 49 from engagement with the nose 32 on the driving pawl 29 so that this driving pawl immediately pivots in the anti-clockwise direction, as seen in FIG. 7, so as to bring its lug 31 into the path of movement of the aforesaid dog on the turntable boss so that the turntable boss now commences to drive the driving flange 27 and thus causes rotation of the worm 21 and consequent rotation of the gear 24 and control cam shaft 25.

As described in the aforesaid co-pending application, various cams positioned at the end of the cam shaft 25 remote from the gear 24 bring about the cycle of operations above referred to for the movement of the pick-up arm.

DISENGAGEMENT OF THE DRIVE TO THE WORM AND WHEEL GEARING

As seen in FIG. 2, the latch lock 51 occupies an opening 59 in the deck plate 11 and it has a lug 60 (see FIG. 4) depending downwardly below the deck plate 11 and this lug 60 has an inclined edge 61 and is positioned so that it is in register with a cam 62 fixed on the control cam shaft 25. The part 52 of the latch lock is connected to deck plate 11 by a pin 52A sliding against spring pressure so that the latch lock can rock about this mounting point.

At the appropriate instant in the cycle of operations the high part of cam 62 engages the incline 61 on lug 60 of the latch lock and causes a rocking movement of the latch lock so that, as seen in FIG. 2, its lug 53 moves upwardly away from the deck plate and thus enables the end 48 of latch 44 to snap under the lower shoulder 55 of the latch lock under the influence of the spring 47 which, as previously mentioned, tends to pivot the latch 44 in the clockwise direction, as seen in FIG. 1. This section of the latch lock has therefore brought the lug 49 on the end of the latch back into its original position where it can engage the nose 32 on the driving pawl 29 and after the high part of cam 62 has moved out of engagement with incline 61 on the latch lock, the latch lock is returned by spring pressure due to the spring 46 to its original position in which the lug 53 moves downwardly towards the deck plate and thus moves the end 48 of the latch downwardly so that when the nose 32 of the driving pawl 29 next comes round it will engage against the lug 49 of the latch and cause a pivotal movement of the driving pawl 29 in the anti-clockwise direction, as seen in FIG. 7, thus drawing its driving lug 31 out of engagement with the dog on the turntable boss and thus disconnecting the drive between the turntable boss and the worm and wheel gearing. Thus the latch 44 and driving pawl 29 are now back in their original non-driving positions ready for a fresh operation of the trip arm 36 to once again initiate the connection of the drive to the worm and wheel gearing. It will be observed that pivot pin 45 is in a short slot 45A in the latch 44 and spring 47 normally urges latch 44 outwardly but when the nose 32 on the driving pawl engages the lug 49 it first causes the latch 44 to be drawn inwardly, stressing spring 47, and then there is a snap disengagement between lug 49 and nose 32, giving the driving pawl 29 a sharp pivotal movement to ensure that it is swung back right into its disengaged position.

As described in the afore-said co-pending application, after each operation of the trip arm 36 to start off a cycle of operations, mechanism operated from the cam shaft 25 is brought into play to move the trip arm 36 pivotally in the clockwise direction, as seen in FIG. 1, to restore it to its original position.

OPERATION OF UMBRELLA SPINDLE

For the operation of the umbrella spindle 19, the cam 62 already referred to is used and also two further identical cams 63 provided on the cam shaft on either side of the gear wheel 24 and these three cams 62 and 63 act upon a slide 64 which is mounted below the deck plate 11 for reciprocating movement in a substantially horizontal direction and for rocking movement about a horizontal axis.

The slide 64 is mounted upon members which are integral parts of the sub frame 16 and at the one end the slide 64 has a mounting upon a depending pillar 65, there being an upwardly projecting pin 66 which passes through a slot in the end of the slide and has a spring 67 at its upper end pressing downwardly on this end of the slide.

At the other end the slide is mounted via a slot about a pin 68 which extends downwardly and is mounted in a part of the well 17 which is integral with the sub frame 16 and also at its upper end this pin 68 has a spring 69 pressing against this end of the slide 64.

Intermediate its ends and arranged in the region below the centre spindle 19 the slide has a keyhole slot 70.

The slide 64 has at each side an upwardly presented lug 71 and these lugs 71 are held resiliently in engagement with their respective cams 63 by virtue of the action of the springs 67 and 69 and the slide 64 also has a laterally projecting lug 72 which co-operates with the cam 62 and is held resiliently against such cam by the spring 73 connected at its one end to the slide 64 and at its other end to the pillar 65.

The lower end of the umbrella spindle projects freely through the enlarged part of the keyhole slot 70 and under the action of the cam 62 and spring 73 the slide 64 is moved to bring the narrower part of the keyhole slot 70 into engagement with the lower end of the umbrella spindle as the slide 64 moves in the one direction of its reciprocating movement. This narrower part of the keyhole slot 70 is then in engagement with a flange on the lower end of the umbrella spindle and the action of the cam 63 acting upon the lug 71 is to move the slide downwardly away from the deck 11 and thus cause this flanged lower end of the umbrella spindle to be drawn downwardly and to cause operation of the supporting fingers 20 in known manner to release the lowermost record of a stack and allow is to drop down on to the turntable. Upon further rotation of the cam 62 and 63 the slide 64 is returned to its original position in which the lower end of the umbrella spindle now projects through the enlarged portion of the keyhole slot 70.

Thus the cams 62 and 63 acting upon the slide 64 product the operation of the umbrella spindle to cause release of the lowermost record of the stack on the spindle to allow it to drop on to the turntable when the record player is being used for playing automatically a number of records in succession.

The mechanism indicated generally by the arrow A in FIG. 3 concerned with the switching on and switching off of the record player is more particularly described in the aforesaid co-pending application and as such does not form part of the invention covered by the present application.

We claim:

1. An automatic record player comprising:

a. a fixed deck plate, b. a turntable capable of rotating in use about an axis relative to the deck plate, c. a rotatable cam shaft, d. a worm gear mounted about said axis, e. a wheel drivingly engaged with said worm gear and fixed on said cam shaft, f. drive means acting between said turntable and the worm and wheel gearing, said drive means comprising:

i. a dog mounted on the turntable for rotation therewith, ii. a spring loaded driving pawl carried on the worm gear, said pawl having a driving lug adapted to be drivingly engaged by said dog to cause driven rotation of the worm and to cause driven rotation of the worm and wheel gearing, g. drive preventing latch means for preventing operation of said drive means during playing of a record comprising:

i. a latch arm mounted on the deck plate for pivotal movement about a vertical axis intermediate its ends and limited rocking movement about a horizontal axis intermediate its ends, the latch arm being engageable with said pawl to retain its lug out of the path of the driving dog and hence prevent operation of the drive means, ii. a latch lock comprising a plate rockably mounted on the deck plate, said rockable plate having two stepped shoulders each engageable by the latch arm, engagement with one of which shoulders defines a position where the latch arm is engaged with said pawl, iii. spring means urging the latch arm into engagement with either one of the shoulders, h. and drive initiating means for overriding the drive preventing latch means and enabling the drive means to operate, comprising, i. a trip arm pivotally and slidably mounted on the deck plate, one end thereof being positioned so that, on pivotal movement of the trip arm said end comes into the path of movement of the dog, the trip arm being slid into engagement with the latch arm by contact with the dog to cause rocking movement of the latch arm out of engagement with said one shoulder and into engagement with the other shoulder, whereby the latch arm disengages the pawl, ii. a trip lever capable of pivotally moving said trip arm, j. and mechanism for operating an umbrella type centre spindle, said mechanism comprising:

i. an elongated slide mounted below the deck plate on the record player for reciprocating movement in a substantially horizontal plane and also rocking movement about a horizontal axis which is at right angles to the longitudinal axis of the slide, ii. means on the slide for engaging the lower end of the umbrella centre spindle, iii. a cam fixed on the cam shaft and engaging a projection on the slide to produce reciprocating movement of the slide, iv. a pair of identical cams fixed on the cam shaft at positions spaced apart axially of the cam shaft and engaging the slide on opposite sides of its longitudinal axis to produce said rocking movement of the slide.

* * * * *